Figure 1:
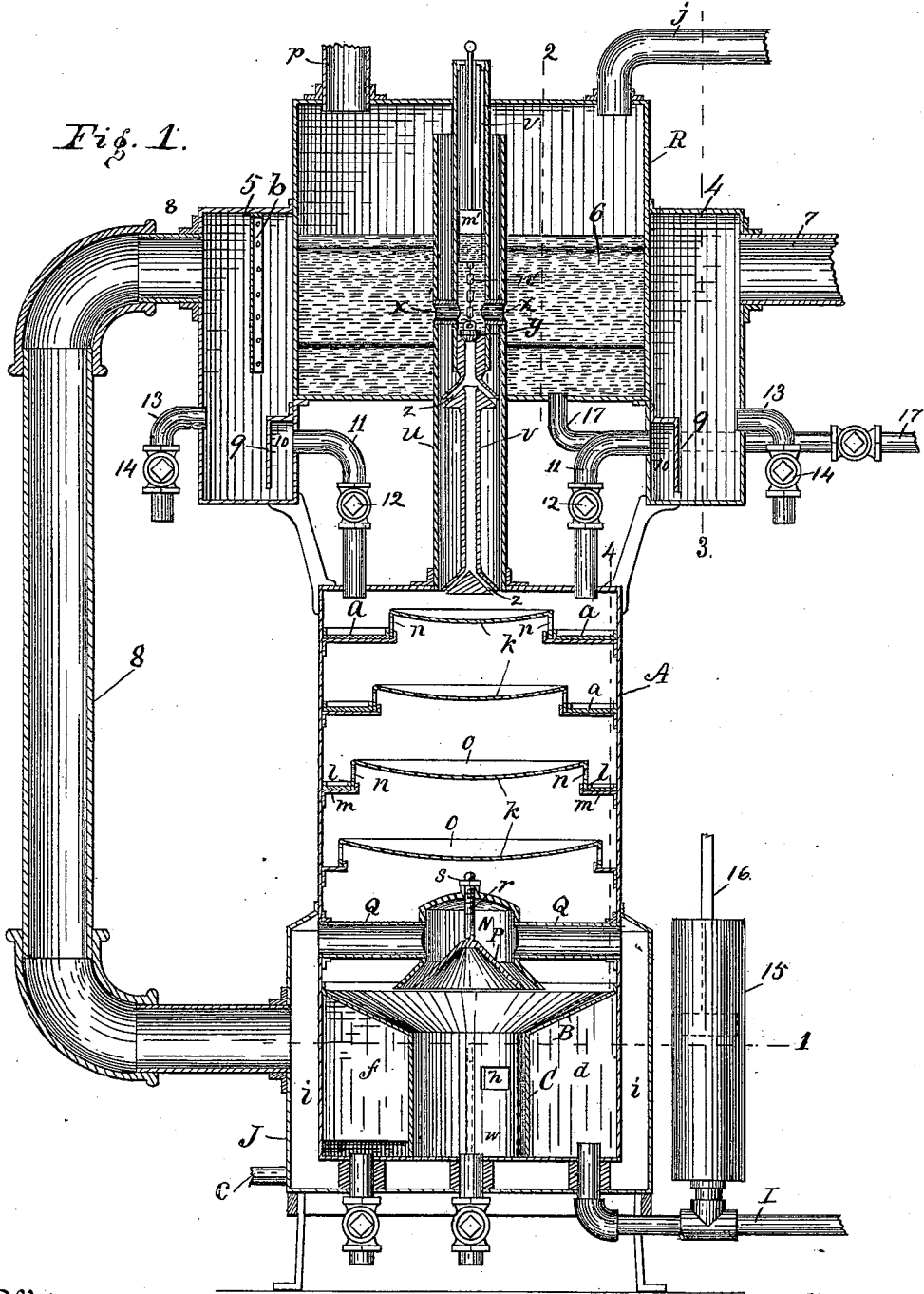

(No Model.) 2 Sheets—Sheet 1.

F. L. McGAHAN.
FEED WATER HEATER.

No. 427,266. Patented May 6, 1890.

Witnesses
V. M. Hood
Frank A. Jacob

Inventor
Fred. L. McGahan.

By His Attorney
H. P. Hood.

(No Model.) 2 Sheets—Sheet 2.

F. L. McGAHAN.
FEED WATER HEATER.

No. 427,266. Patented May 6, 1890.

Witnesses
V. M. Hood
Frank A. Jacob

Inventor
Fred. L. McGahan.
By His Attorney
H. P. Hood.

UNITED STATES PATENT OFFICE.

FRED. L. McGAHAN, OF INDIANAPOLIS, INDIANA.

FEED-WATER HEATER.

SPECIFICATION forming part of Letters Patent No. 427,266, dated May 6, 1890.

Application filed February 27, 1890. Serial No. 341,948. (No model.)

*To all whom it may concern:*

Be it known that I, FRED. L. McGAHAN, a citizen of the United States, residing at Indianapolis, in the county of Marion and State of Indiana, have invented a new and useful Improvement in Feed-Water Heaters and Purifiers, of which the following is a specification.

My invention relates to an improvement in a feed-water heater and purifier for which an application for a patent, Serial No. 331,480, is now pending, and in which I have an interest. In the device there shown the feed-water is received into the upper part of a cylindrical closed tank, and, passing over a series of settling-pans through an atmosphere of exhaust-steam, is collected in a central well at the bottom of the tank. The central well is surrounded by a series of settling-chambers formed in the annular space between the well and the outer walls of the tank, and the water passes from the well through the settling-chambers in succession and is drawn off from the last one to the boiler. The water in passing through the tank is heated by contact with exhaust-steam, which first enters a chamber where the grease and like impurities carried by exhaust-steam in mechanical suspension are deposited, together with a certain amount of water formed by the partial condensation of the steam, which water and grease are drained off together, and the steam is then passed into the water-space of the tank and is discharged above the well, and, passing upward around the settling-pans, the uncondensed portion of the steam passes off. In a heater and purifier thus formed that portion of water which is first formed by condensation in the grease-chamber is lost. This water contains not only much heat, but also a certain amount of material supposed to be of the nature of paraffine, which is washed from the oil, when mineral oil is used, and which forms, when introduced into boilers, a coating on the tubes and shell, which prevents the adherence of scale.

One object of my improvement is to provide means for separating the grease or oil from this first water of condensation and for discharging the water into the water-tank, whence it is drawn with the rest of the water into the boiler.

Another object of my improvement is to provide means for heating the water in the settling-chamber by the exhaust-steam before the steam enters the water-space of the tank.

A further object of my improvement is to provide a supplemental water-tank, in which shall be stored at all times a body of water supported above the level of the boiler, from which the boiler may be filled for starting, by the force of gravitation, which water shall be heated by the exhaust-steam and shall assist in the complete condensation of the exhaust-steam, all as hereinafter fully set forth.

The accompanying drawings illustrate my invention.

Figure 2:
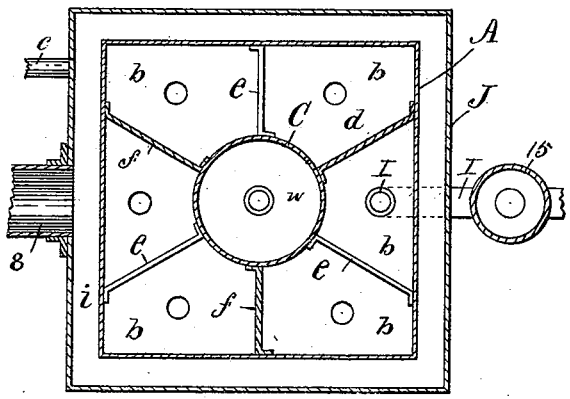
Figure 5:
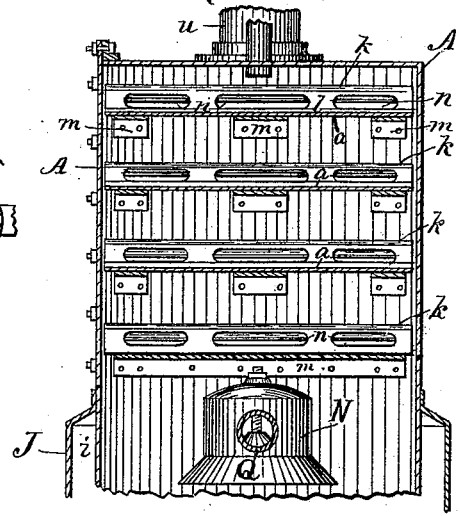
Figure 3:
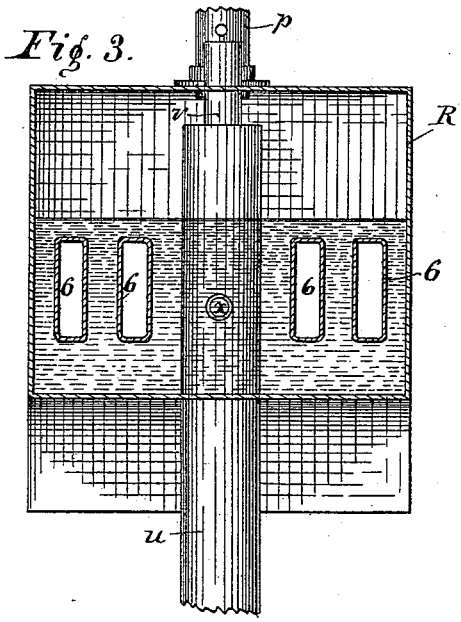
Figure 4:
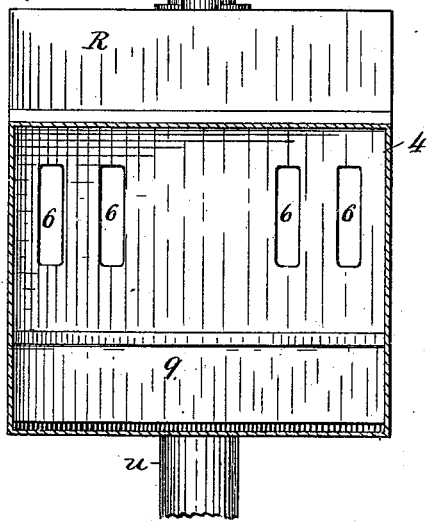

Figure 1 represents a central vertical section of the entire heater. Fig. 2 represents a transverse section at 1, Fig. 1. Fig. 3 represents a partial vertical section at 2 and at right angles to the plane of Fig. 1. Fig. 4 represents a similar section at 3, Fig. 1. Fig. 5 represents a partial section in a like plane at 4, Fig. 1.

In the drawings, A is a rectangular closed tank having near its lower end a transverse dish-shaped partition B, inclined on all sides toward a central vertical partition C, which forms a central well $w$ in the lower part of the tank. The annular space between partition C and the outside walls of the tank is divided by a series of radial partitions $d\ e\ f$ into a series of settling-chambers $b$, the first of which communicates with a well through an opening $h$ in partition C. Partition $d$ fills the whole height and width of the space, so as to form a tight partition; but partitions $e$ are short at the top and partitions $f$ are short at the bottom, so that water from the well may pass through the settling-chambers in succession and be drawn from the last chamber through the water-discharge pipe I, the arrangement in this respect being the same as that shown in the pending application above mentioned.

For the purpose of heating the water in the settling-chambers they are inclosed in a steam-jacket formed by an outside shell J, surrounding and extending beneath the lower part of tank A and forming an annular space $i$. The upper part of tank A is occupied by a series of shelves or shallow pans $k\ k$. Pans $k$ are formed of sheet metal, and are bent to form segments of cylinders with a downwardly-extending flange $l$ at each edge. The lower edges of flanges $l$ rest on brackets $m$, secured to the side walls of tank A, and are provided with a series of large perforations $n$ $n$, for the purpose of permitting the free passage of steam from below upward around the edges of the pans. The bracket $m$ for the lower pan $k$ is continuous the entire length of the pan. The ends of the pans are closed by end pieces $o$, and the arrangement and width of the pans are such that water falling into and filling the upper pan flows over the edges into shallow narrow pans $a$ $a$, and from thence through the perforations $n$ into the next pan below, and so on throughout the series. One side of tank A, above the steam-jacket and opposite the ends of the pans, is made removable, as indicated in Fig. 5, for the purpose of conveniently removing or cleaning the pans.

Arranged above the central well $w$ is a bell-shaped chamber N, having a conical deflector P adjustably suspended in its mouth by means of a threaded rod $r$ and nut $s$, thus forming an adjustable annular opening or passage $t$. The interior of chamber N is connected by pipes Q Q with the annular steam-space $i$.

R is a closed tank mounted above tank A and connected therewith by means of a central vertical flue $u$ and a pipe $v$, arranged concentrically within the flue and extending out through the top of the tank. Flue $u$ connects the upper part of tank R with the upper part of tank A, and is designed for the passage of steam only from tank A to tank R. Pipe $v$ is connected with the interior of tank R near its bottom by short tubes $x$ $x$, which pass radially from the pipe through the walls of flue $u$. Pipe $v$ is contracted immediately below the tubes $x$ to form a valve-seat, in which a valve $y$ rests, and is provided below the valve with inclined lateral discharge-ports $z$ $z$, so arranged as to discharge water therefrom into the flue in a thin sheet. Arranged in pipe $v$ above the valve is a float $m'$, which is connected to the valve by a short chain $n'$. A water-supply pipe $j$ enters the top of tank R, and a pipe $p$ permits the escape of steam therefrom. Secured to opposite sides of tank R are a pair of closed chambers 4 and 5, which communicate with each other through a series of flues 6, which pass horizontally across the interior of the tank. In chamber 5 a partition $b$ depends from the top of the chamber to a point below the flues 6. This partition I term a "deflecting-plate." Steam is admitted to chamber 4 through a pipe 7, and chamber 5 is connected with the annular space $i$ around tank A by a steam-pipe 8. The arrangement of steam-pipes 7 and 8 is such that they are opposite the central space between the flues 6, so that steam entering chamber 4 is projected against the opposite wall of the chamber, and the steam in passing out of the flues into chamber 5 strikes the deflecting-plate $b$, and, passing underneath the plate, leaves the chamber through pipe 8. This arrangement causes the precipitation in chambers 4 and 5 of all the grease and oil held in suspension in exhaust-steam, and also the precipitation in those chambers of a certain amount of water which appears to hold in solution certain elements of mineral oils, which give to the water a milky or translucent appearance, but are devoid of greasiness. The arrangement of a grease-collecting chamber with inlet and outlet pipes arranged in different planes is found in the before-mentioned pending application, and is therefore not claimed herein.

It has been found that while the presence of oil and grease is a disadvantage in feed-water for boilers, the presence of the oil elements above spoken of as being held in solution is an advantage, as they form a coating on the interior of the boiler, which prevents the adherence of scale.

For the purpose of separating the grease from the condense-water in chambers 4 and 5 and discharging the water into tank A, so that it will be conveyed with the rest of the feed-water to the boiler, I secure to one of the side walls of each chamber a hanging partition 9, which extends nearly to the bottom of the chamber, and from the narrow compartment 10 thus formed a pipe 11, having a valve 12, extends into tank A. On the opposite side of the chamber is a pipe 13, arranged above the plane of pipe 11 and having a valve 14.

For the purpose of regulating the withdrawal of water from tank A a stand-pipe 15, holding a float connected by a rod 16 with the throttle-valve of the pump which supplies the boiler, (not shown,) is connected to the water-discharge pipe I. A pipe 17 leads from the bottom of tank R to the boiler (not shown) arranged below the level of the tank.

In operation water from a suitable source of supply, being admitted to tank R through the supply-pipe $j$, enters the pipe $v$ through tubes $x$ above valve $y$, the valve being closed. When the water has filled tank R to a point above the flues 6, any increase of water raises float $m'$ and valve $y$, thereby permitting the water to flow down through pipe $v$ into the upper pan $k$, and from thence flows over the pans in succession, and finally collects in well $w$ and the settling-chambers. Exhaust-steam, being admitted to chamber 4 through pipe 7, strikes the opposite wall, and being deflected passes to each side of the point of entrance through flues 6 to chamber 5, where it is again deflected and passes through pipe 8 to the steam-jacket $i$, which it fills and passes from thence through pipes Q to the bell-shaped chamber N, from whence it is discharged downward into the tank A through the adjustable annular opening $t$. By the adjustment of the deflector P up or down opening $t$ is contracted or enlarged, thus controlling the flow of steam at this point. The steam rises under the pans $k$, passes through the openings $n$, over which the water is dripping, to the next pan above, and finally out through flue $u$ to the upper part of tank R, where any steam which remains uncondensed escapes through pipe $p$. The oil and water which are precipitated in chambers 4 and 5 fall to the bottom of the chambers, and, quickly filling the space below the lower edge of the partitions 9, seal the compartments 10, and all the oil or grease falling thereafter remains on top of the water in the chambers. Valves 12 in pipes 11 being now opened, when the water rises to the top of compartments 10 it overflows into the tank A. To remove the grease, valves 12 are closed, and, the water being allowed to collect until the grease is opposite pipes 13, valves 14 are then opened and the grease is drawn off.

It will be observed that the arrangement of valve $y$ and float $m'$ is such that tank R always retains a supply of water, which is ready to be drawn upon for filling a boiler before the pumps are started, and that the water before overflowing into tank A is warmed, after the engine has been started, by the steam passing through flues 6, so that when the water reaches the settling-pans $k$ it is quickly heated to that temperature which will cause a precipitation of the lime compounds held in solution. The water in tank R also operates to condense the steam which may rise from tank A through flue $u$. The water collecting in the well $w$ and the settling-chambers $b$ leaves there its sediment and is kept hot by the steam in space $i$. Condensed steam collecting in space $i$ is drained off through an open pipe $c$ to a well, from whence it may be pumped to the boiler. By this construction the feed-water for a steam-boiler is thoroughly freed from lime compounds and other like impurities, nearly all the heat in the exhaust-steam is returned to the boiler, and the introduction of grease into the boiler is avoided.

I claim as my invention—

1. In a feed-water heater and purifier, the combination of two tanks arranged one above the other and having their interiors connected, steam-flues arranged to traverse the interior of the upper tank, a water-supply pipe arranged to enter the upper tank, a series of settling-pans arranged in the lower tank to receive in succession water from the upper tank, a water-discharge pipe leading from the lower tank, a valve mounted in the passage between the tanks, and a float arranged to be operated by the water in the upper tank and connected to the valve, all arranged to co-operate substantially as set forth, whereby a quantity of water is retained in the upper tank and is warmed, substantially as and for the purpose specified.

2. In a feed-water heater and purifier, the upper tank, the water-supply pipe therefor, the lower tank, the vertical flue extending from the lower tank through the upper tank to a point above the water-line therein, the water-pipe arranged within said flue and communicating with the interior of the upper tank through the walls of the flue, the valve arranged within said pipe, and the float attached to the valve, all combined and arranged to co-operate substantially as and for the purpose specified.

3. In a feed-water heater, the combination of tank R, chamber 4, secured to one side of the tank and provided with partition 9, flues 6, extending from chamber 4 across the interior of the tank, a steam-supply pipe arranged to enter said chamber, the water-discharge pipe 11, and oil-discharge pipe 13, all arranged to co-operate substantially as and for the purpose specified.

4. In a feed-water heater and purifier, the combination, with the tank having an interior central well surrounded by a series of settling-chambers and a steam-jacket surrounding said settling-chambers, of the central bell-shaped chamber arranged above said well, the pipes connecting said bell-shaped chamber with the steam-space of the jacket, and the conical deflector suspended in the mouth of the bell, all arranged substantially as specified.

5. In a feed-water heater and purifier, the combination of the upper and lower tanks, the water-supply pipe arranged to enter the upper tank, the steam-flue and the water-pipe connecting said tanks, the valve and float arranged in the water-pipe, the steam-chambers forming grease-traps arranged on opposite sides of the upper tank, the flues passing through the upper tank and connecting said chambers, the steam-supply pipe arranged to enter one of said chambers, the steam-pipe arranged to connect the opposite chamber with the lower tank, and the water-discharge pipe leading from the lower tank, all arranged substantially as specified.

FRED. L. McGAHAN.

Witnesses:
A. L. McGAHAN,
V. M. HOOD.